Patented Aug. 20, 1946

2,406,191

UNITED STATES PATENT OFFICE 2,406,191

MANUFACTURE OF ELASTIC COMPOSITION SUITABLE FOR ELECTRICAL CABLE INSULATION

Hugh J. Cameron, Gary, Ind., assignor to Edgar F. Seifert, Chesterton, Ind.

No Drawing. Application January 11, 1943,
Serial No. 472,071

6 Claims. (Cl. 260—42)

The present invention relates to the production of compounds or compositions having some of the desirable physical characteristics of rubber, and in particular to such which are useful like rubber for extrusion over a centered strand, such as an electric wire conductor, to effect an electrical insulating covering.

The present invention is particularly directed to a composition which is a mixture, and which derives its properties from its two essential components. One of these is polystyrene. The other is polyisobutylene.

It is a general object of the invention to compound polystyrene and polyisobutylene to form a rubber substitute.

It is a particular object of the invention to compound polystyrene and polyisobutylene in such a way that the resulting composition acts as a homogeneous mixture capable of being extruded while hot and under high pressure to provide a rigid non-tacky body, such as a sheath on a wire, which sheath presents resistance to softening and flow at temperatures likely to be encountered in use, and presents valuable electrical properties for use with high tension and high frequency currents in an electrical conductor insulated therewith.

Various other and ancillary objects and advantages of the invention will appear from the following description and explanation of the invention.

In one instance British Patent No. 534,464, accepted June 6, 1939, states that it is impossible to mix the two ingredients on mixing rolls. This is true for some conditions, but not for all conditions, as will be explained hereinafter.

The initial objective giving rise to the present invention was the provision of a rubber substitute for insulating electric conductors by the extrusion procedure. In attaining this objective it has been discovered how polystyrene and polyisobutylene may be successfully combined to give elastic compositions, some of which are suitable for the more exacting requirements of electrical insulation, and others of which have uses otherwise.

Attempts heretofore have been made to combine polystyrene and polyisobutylene, but failures and difficulties have been encountered, and products of only limited value have been attained.

Also, British Patent No. 506,855, accepted June 6, 1939, teaches that polystyrene and polyisobutylene may be combined in a kneader in proportions from 1 to 9 parts of any one with the other at temperatures from 100° C. to 200° C., and then the mixture made into a film or foil with two rolls running at the same speed, but not with rolls running at different speeds, otherwise trouble is experienced. The product of the kneader so made, may be extruded when combined with a solvent such as carbon tetrachloride. In such extrusion the temperature of the machine should be below 80° C., while the nozzle should be above 100° C. The solvent is used to render the material plastic for the purpose of extrusion.

Others have attempted to secure mixtures operative for hot extruding processes, and containing polystyrene and polyisobutylene, but resorting to a different method to achieve a product capable of extrusion. Instead of combining the said two ingredients, a mixture is first made of styrene monomer and polyisobutylene, and this mixture is treated to effect polymerization of the styrene to polystyrene. The results so obtained are not comparable to those attained by the present invention, and the differences are attributed in part to the fact that the polymerization of styrene in the presence of polyisobutylene as a diluent therefor, gives a different type of molecular structure to the polystyrene which results. The catalyst for the polymerization is not readily eliminated.

The present invention provides a product which is a physical mixture of one polymer consisting of polymerized styrene or polystyrene, with another polymer consisting of polymerized isobutylene or polyisobutylene. It is a type of mixture which the art has not heretofore attained, and, contrary to the teachings of the art, it may be subjected to the action of two mixing rolls of differential speed, under certain conditions. In fact the mixture may be initially effected by use of such rolls, contrary to the tachings of the art.

The conventional practice in use of differential rolls, as used in the rubber industry, and as used in the art of rubber substitutes, is to use cored rolls, or hollow rolls, having cooling water running through them to carry away the heat of friction. Such use of cooled rolls applied to the mixture produced by the present invention, ruins the product, causing it to crumble.

In experiments leading to the present invention it was discovered that dispensing with the cooling water did not overcome the difficulty, or permit mixing the two ingredients to effect a uniform mixture. It was also discovered that the introduction of steam into the rolls did not effect any new result, until the roll temperature attained at least 300° F. Below this point a non-uniform mixture merely passes through the rolls and discharges as a non-uniform mixture. But at and above this temperature for the differential mixing rolls, the non-uniform mixture begins to smooth out, to lose its shortness, and mutually to combine the ingredients to produce a smooth plastic elastic composition having many physical properties of rubber, including that of extrudability while hot.

The softness of the resulting uniform mixture when normally cold, and its degree of tackiness, or the lack of it, depend upon both the proportions of the two polymers used, and upon the degree of polymerization of each of the polymers.

For the purpose of providing a suitable electrical insulation, which is sufficiently non-tacky, and sufficiently resistant to softening and flow at temperatures encountered practically in use of electrical conductors insulated with it, definite lower limits of degrees of polymerization have been determined for each polymer, and limiting proportions of such polymers have also been determined. However, for other uses, and for less drastic conditions of exposure of insulated conductors, polymers and proportions outside of such specifications, may be employed.

Polystyrene

Polystyrene, as the product referred to in the present invention, is a product of polymerizing styrene in the absence of diluents. As the degree of polymerization increases the molecular weight increases. Polystyrene is at normal temperature a transparent brittle solid, capable of becoming plastic at an elevated softening temperature, and of flowing as a plastic mass, especially under high pressure. The higher the degree of polymerization, the less is the plasticity or flow for a given temperature and applied pressure. In fact, polystyrene is commercially specified by this property, in terms of time of flow at a given temperature under a given pressure in a specified type of plastometer. Such an instrument is the Rossi-Peekes plastometer (U. S. Patent No. 2,066,016), and it is commonly used at 130° C. under 1000 lbs. pressure per sq. in. Such a plastometer is manufactured by Tinius Olsen Testing Machine Company, Philadelphia, Pennsylvania. The method is referred to by the American Society of Testing Materials publication D569–41T.

The molecular weight of polystyrene is a poor value for specifications, because polystyrene is a mixture of higher and lower polymers, and a molecular weight identification is merely an average. The distribution of all the polymers, rather than the average molecular weight of the composition predetermines the plasticity or flow-time, which are the important properties pertinent to the present invention for defining polystyrene to be used within the prescribed compositions for high frequency electrical insulation.

Polyisobutylene

Polyisobutylene, as the product referred to in the present invention, is provided by polymerizing isobutylene at a temperature below −50° C. and through the use of an amphoteric halide catalyst. A low degree of polymerization provides a polymer which is liquid at normal temperature of 70° F. As the degree of polymerization increases, a polymer which is solid at a normal temperature of 70° F. is attained, which polymer becomes plastic with heating. It is commercially defined by molecular weight, as calculated from viscosity by the Staudinger equation.

It is believed that the following is the equation so employed:

$$U_r - 1 = KMC$$

wherein $U_r = \dfrac{\text{viscosity of solution of polymer}}{\text{viscosity of solvent}}$ $K$ = constant
$C$ = gram unit groups per liter in solution
$M$ = molecular weight of polymer In carrying out the present invention it is necessary, in producing the desired mixture of any polystyrene and any solid polyisobutylene, to use mechanical means to effect both a mixing and masticating action, and in so doing to have a contact mechanical means at a temperature of at least 300° F. The term "masticating" as used herein, is defined as a frictional or shearing action on a mass containing the unmixed materials, whereby there is a stretching of the mass, as will occur when a relatively thin mass is pinched between two parts moving relatively to each other whereby to effect a tearing and shearing of one layer of the material from an adjacent layer while said material is in contact at the point of such mastication with physical means having a temperature of at least 300° F. These moving parts may be the nip of heated rolls running at different speeds in opposite directions, as in conventional rubber-mixing differential rolls. Being highly viscous and plastic, the masticating action pulls one layer from an adjacent layer and stretches the mass locally, effecting an action which produces the desired uniform mutual incorporation of the two polymers. The temperature of the mass under such action may actually be higher than the contact temperature of the mechanical means, due to friction within the mass locally being masticated.

It has been determined that a mass having the polymers unmixed, must be raised in temperature by contact at the point of mastication with means having a temperature of at least 300° F., in order to impart to it the property of responding to the mastication for mixing to uniformity. In fact, it has been shown by experience that a product already mixed to uniformity in accordance with the present invention, and in process of mastication between differential rolls at 300° F. or above, will become short and crumble if the temperature of the rolls drops below 300° F. The mixture is not thereby destroyed, for each crumb remains as a particle of the mixture. However, the important point is that conditions which crumble the mixture are insufficient to produce the mixture from a non-uniform mixture of the constituents.

In producing the composition the preferred method is to use differential rolls heated to at least 300° F., preferably by steam within the rolls. First, polystyrene is fed to the rolls in quantity peripherally to cover the slower roll and to fill a portion of the nip with a mobile mass thereof. To this, preferably at the nip, is added a smaller amount of solid polyisobutylene. The latter is preferably in particle form, the smaller the particles, the more speedy the incorporation. Continuation of the masticating action carries the added material as a plastic unincorporated substance continually around one roll and through the nip, gradually effecting its distribution uniformly into the polystyrene base or the mixture which results. More polyisobutylene is added until any desired proportion has been assimilated. All the desired polyisobutylene may be added at once, in the first instance, or it may be added in stages, or it may be added gradually at a uniform rate. The quickest results are obtained by adding it throughout a period of time as it is seen that the mass is becoming smooth and uniform from the assimilation of that previously added. In the end, a mastic, elastic, rubber-like sheet may be removed from the slower roll around which it forms, as in conventional rubber practice, the difference being that the material is at a higher temperature than in the case of using such mixing rolls with other materials.

For the purpose of desirable extrudable electrical insulation, which is suitably resistant to softening and flow with heat, and substantially non-tacky, a polystyrene is used having a flow-time of at least 120 seconds for a flow of 1.5 inches in a Rossi-Peekes plastometer at 130° C. and at 1000 lbs. pressure per sq. inch. A polyisobutylene is used having a molecular weight of at least 60,000 as determined by viscosity by the Staudinger equation.

Having selected such polymers the proportions used are from 1 to 9 parts by weight of polyisobutylene to 1 part by weight of polystyrene. This gives limiting compositions of one mixture having equal parts of each polymer, and another mixture having 10% by weight of polystyrene. Mixtures within this range are substantially non-tacky, are extrudable by heat, suitably resistant to softening and flow under heat below 300° F., and of varying degrees of softness when cold, the equal-part mixture being the least soft.

Such a mixture may be placed in a rubber-extruding machine having a moving conductor centered in the orifice or nozzle, and having high mechanical pressure active on the mixture. The mixture must have a temperature of at least 300° F. in the body behind the orifice, but where a nozzle of uniform cross-section may lead from the initial orifice, the nozzle may be colder than 300° F., and preferably is colder, whereby the discharged extruded mass is chilled to a rubber-like solid sheath over the conductor.

Such a sheathed conductor may be bent to small angles without breaking, due to the elasticity of the mass, and in mechanical respects acts like a vulcanized rubber covering.

Where a product of the invention is mixed as described above, it may be sheeted in calender rolls running at the same speed, provided they are heated to 300° F. or higher. Any pressure molding operation effecting a material temperature of 300° F. or higher may be employed. Tackiness of a composition, as for example resulting from use of a solid polyisobutylene having a molecular weight value lower than the specified 60,000 is permissible, depending upon the use to which the product is put. Even tackiness of a sheath on a conductor is permissible, where other covering, such as fabric or metal is placed over a sheath consisting of a mixture of independently polymerized styrene and independently polymerized isobutylene, characterizing the present invention.

Tackiness of a layer calendered at 300° F. or over, as onto a fabric, is advantageous, as for example in making an adhesive or friction tape. For such a purpose, paper, cloth, Cellophane and the like may be adopted as the base.

From the foregoing it will be appreciated that numerous variations of the process, and numerous products may be made without departing from the spirit and scope of the invention as expressed in the appended claims.

I claim:

1. The method which comprises subjecting polystyrene consisting of a polymerized mass originally consisting substantially entirely of styrene and characterized by a flow-time of at least 120 seconds for a flow of 1.5 inches as tested in a Rossi-Peekes plastometer at 130° C. with 1,000 lbs. pressure per sq. in., to the masticating mixing action of two adjacent parallel mixing rolls having a plasticizing temperature for the polystyrene of at least 300° F. and rotating in opposite directions at different speeds, whereby the polystyrene is rendered plastic and capable of assimilating polyisobutylene, continuing the masticating action and gradually adding to the mass being masticated a polymer consisting of polyisobutylene characterized by a normally solid state at 70° F. and by a molecular weight of at least 60,000, as determined by viscosity using the Staudinger equation, until a quantity of from 1 to 9 parts of polyisobutylene has been added to 1 part of polystyrene, whereby the added polyisobutylene is gradually incorporated into a resulting uniform mixture of said polystyrene and said polyisobutylene, and after the addition of the last of the polyisobutylene continuing the mastication until the last added material is uniformly incorporated into the mixture.

2. The method which comprises subjecting polystyrene consisting of a polymerized mass originally consisting substantially entirely of styrene and characterized by a flow-time of at least 120 seconds for a flow of 1.5 inches as tested in a Rossi-Peekes plastometer at 130° C. with 1,000 lbs. pressure per sq. in., to the masticating mixing action of two adjacent parallel mixing rolls having a plasticizing temperature for the polystyrene of at least 300° F. and rotating in opposite directions at different speeds, whereby the polystyrene is rendered plastic and capable of assimilating polyisobutylene, continuing the masticating action and gradually adding to the mass being masticated a polymer consisting of polyisobutylene characterized by a normally solid state at 70° F., until a quantity of from 1 to 9 parts of polyisobutylene has been added to 1 part of polystyrene, whereby the added polyisobutylene is gradually incorporated into a resulting uniform mixture of said polystyrene and said polyisobutylene, and after the addition of the last of the polyisobutylene continuing the mastication until the last added material is uniformly incorporated into the mixture.

3. The method which comprises subjecting polystyrene consisting of a polymerized mass originally consisting substantially entirely of styrene and characterized by a flow-time of at least 120 seconds for a flow of 1.5 inches as tested in a Rossi-Peekes plastometer at 130° C. with 1,000 lbs. pressure per sq. in., to the masticating mixing action of two adjacent parallel mixing rolls having a plasticizing temperature for the polystyrene of at least 300° F. and rotating in opposite directions at different speeds, whereby the polystyrene is rendered plastic and capable of assimilating polyisobutylene, continuing the masticating action and gradually adding to the mass being masticated a polymer consisting of polyisobutylene characterized by a normally solid state at 70° F. and by a molecular weight of at least 60,000 as determined by viscosity using the Staudinger equation, until a quantity of from 1 to 9 parts of polyisobutylene has been added to 1 part of polystyrene, whereby the added polyisobutylene is gradually incorporated into a resulting uniform mixture of said polystyrene and said polyisobutylene, and after the addition of the last of the polyisobutylene continuing the mastication until the last added material is uniformly incorporated into the mixture, and sheeting the resulting uniform mixture between rolls operating at the same speed and having a plasticizing temperature for the mixture of at least 300° F.

4. The method which comprises subjecting polystyrene consisting of a polymerized mass originally consisting substantially entirely of styrene and characterized by a flow-time of at least 120 seconds for a flow of 1.5 inches as tested in a Rossi-Peekes plastometer at 130° C. with 1,000 lbs. pressure per sq. in., to the masticating mixing action of two adjacent parallel mixing rolls having a plasticizing temperature for the polystyrene of at least 300° F. and rotating in opposite directions at different speeds, whereby the polystyrene is rendered plastic and capable of assimilating polyisobutylene, continuing the masticating action and gradually adding to the mass being masticated a polymer consisting of polyisobutylene characterized by a normally solid state at 70° F. until a quantity of from 1 to 9 parts of polyisobutylene has been added to 1 part of polystyrene, whereby the added polyisobutylene is gradually incorporated into a resulting uniform mixture of said polystyrene and said polyisobutylene, and after the addition of the last of the polyisobutylene continuing the mastication until the last added material is uniformly incorporated into the mixture, and sheeting the resulting uniform mixture between rolls operating at the same speed and having a plasticizing temperature for the mixture of at least 300° F.

5. The method which comprises subjecting polystyrene consisting of a polymerized mass originally consisting substantially entirely of styrene and characterized by a flow-time of at least 120 seconds for a flow of 1.5 inches as tested in a Rossi-Peekes plastometer at 130° C. with 1,000 lbs. pressure per sq. in., to the masticating mixing action of two adjacent parallel mixing rolls having a plasticizing temperature for the polystyrene of at least 300° F. and rotating in opposite directions at different speeds, whereby the polystyrene is rendered plastic and capable of assimilating polyisobutylene, continuing the masticating action and gradually adding to the mass being masticated a polymer consisting of polyisobutylene characterized by a normally solid state at 70° F. and by a molecular weight of at least 60,000 as determined by viscosity using the Staudinger equation, until a quantity of from 1 to 9 parts of polyisobutylene has been added to 1 part of polystyrene, whereby the added polyisobutylene is gradually incorporated into a resulting uniform mixture of said polystyrene and said polyisobutylene, and after the addition of the last of the polyisobutylene continuing the mastication until the last added material is uniformly incorporated into the mixture, and extruding the resulting mixture by applied mechanical pressure while said material is softened and extrudable at a temperature of at least 300° F.

6. The method which comprises subjecting polystyrene consisting of a polymerized mass originally consisting substantially entirely of styrene and characterized by a flow-time of at least 120 seconds for a flow of 1.5 inches as tested in a Rossi-Peekes plastometer at 130° C. with 1,000 lbs. pressure per sq. in., to the masticating mixing action of two adjacent parallel mixing rolls having a plasticizing temperature for the polystyrene of at least 300° F. and rotating in opposite directions at different speeds, whereby the polystyrene is rendered plastic and capable of assimilating polyisobutylene, continuing the masticating action and gradually adding to the mass being masticated a polymer consisting of polyisobutylene characterized by a normally solid state at 70° F. until a quantity of from 1 to 9 parts of polyisobutylene has been added to 1 part of polystyrene, whereby the added polyisobutylene is gradually incorporated into a resulting uniform mixture of said polystyrene and said polyisobutylene, and after the addition of the last of the polyisobutylene continuing the mastication until the last added material is uniformly incorporated into the mixture, and extruding the resulting mixture by applied mechanical pressure while said material is softened and extrudable at a temperature of at least 300° F.

HUGH J. CAMERON.